(12) United States Patent
Ikeda et al.

(10) Patent No.: US 9,574,325 B2
(45) Date of Patent: Feb. 21, 2017

(54) WORK VEHICLE AND CAB FOR WORK VEHICLE

(71) Applicant: KOMATSU LTD., Tokyo (JP)

(72) Inventors: Takeshi Ikeda, Hirakata (JP);
Masamichi Miyazaki, Neyagawa (JP);
Akihiro Miyachi, Hirakata (JP)

(73) Assignee: KOMATSU LTD., Tokyo (JP)

( * ) Notice: Subject to any disclaimer, the term of this patent is extended or adjusted under 35 U.S.C. 154(b) by 115 days.

(21) Appl. No.: 14/436,972

(22) PCT Filed: Mar. 16, 2015

(86) PCT No.: PCT/JP2015/057671
§ 371 (c)(1),
(2) Date: Apr. 20, 2015

(87) PCT Pub. No.: WO2015/137513
PCT Pub. Date: Sep. 17, 2015

(65) Prior Publication Data
US 2016/0305091 A1    Oct. 20, 2016

(51) Int. Cl.
*B60J 7/00* (2006.01)
*E02F 9/16* (2006.01)
*B62D 33/06* (2006.01)
*E02F 3/76* (2006.01)
*B62D 55/06* (2006.01)
*E02F 9/08* (2006.01)

(52) U.S. Cl.
CPC .......... *E02F 9/163* (2013.01); *B62D 33/0617* (2013.01); *B62D 55/06* (2013.01); *E02F 3/7609* (2013.01); *E02F 9/0808* (2013.01)

(58) Field of Classification Search
CPC ....... H01R 23/70; H01R 13/645; H01R 43/22; A01D 2101/00; B62D 7/159; B60L 2200/26; E05Y 2900/55; B60J 1/1853; B60T 13/665; E05F 15/643
USPC .......................... 296/190.08, 190.01, 190.1
See application file for complete search history.

(56) References Cited

U.S. PATENT DOCUMENTS 4,088,364 A    5/1978  Termont
6,155,632 A *  12/2000 Fujimoto ................ E02F 9/163
                                                  180/89.13

(Continued)

FOREIGN PATENT DOCUMENTS

CN    103403267 A   11/2013
JP    2010-95860 A   4/2010

(Continued)

*Primary Examiner* — Kiran B Patel
(74) *Attorney, Agent, or Firm* — Drinker Biddle & Reath LLP

(57) ABSTRACT

A rear portion is arranged in the rear of a front portion, and has a width smaller than a width of the front portion in a plan view. A wall portion extends from the rear portion outward in a width direction toward the front portion and includes two walls opposed to each other in a fore/aft direction with a gap lying therebetween, in a plan view. Electric components are arranged in the gap and project into an indoor space of a cab from the gap through a through hole formed in the front wall. In a plan view, a foremost portion of the electric components is located in the rear of a foremost normal located foremost among normals to a line connecting a front end and a rear end of a doorway, which intersect with the front wall.

6 Claims, 10 Drawing Sheets

(56) References Cited

U.S. PATENT DOCUMENTS

| | | | | |
|---|---|---|---|---|
| 6,206,457 B1* | 3/2001 | Sakyo | ............... | B62D 33/06 296/190.08 |
| 6,330,765 B1* | 12/2001 | Dahl | ............... | B60J 1/16 49/453 |
| 6,796,600 B1* | 9/2004 | Ferer | ............... | B60J 1/2011 296/146.1 |
| 6,837,529 B2* | 1/2005 | Kharod | ............... | B60J 1/1853 296/146.4 |
| 7,093,871 B2* | 8/2006 | Lim | ............... | B62D 33/0636 296/190.11 |
| 7,559,601 B2* | 7/2009 | Ishii | ............... | B60H 1/00378 180/89.13 |
| 7,766,416 B2* | 8/2010 | McClure | ............... | B62D 33/00 296/181.3 |
| 8,033,595 B2* | 10/2011 | Orii | ............... | B62D 33/06 280/801.1 |
| 8,235,156 B2* | 8/2012 | Koss | ............... | B62D 33/0633 180/311 |
| 9,011,220 B2* | 4/2015 | Mayr | ............... | B60H 1/00378 296/191 |
| 9,273,447 B2* | 3/2016 | Kimura | ............... | B60H 1/00378 |
| 2012/0086236 A1* | 4/2012 | Nagami | ............... | B60H 1/00378 296/190.09 |
| 2014/0252803 A1* | 9/2014 | Matsumoto | ............... | E02F 9/0858 296/190.01 |
| 2014/0374186 A1* | 12/2014 | Nagami | ............... | E02F 3/7609 180/291 |
| 2015/0000996 A1* | 1/2015 | Nagami | ............... | E02F 9/163 180/291 |
| 2015/0102637 A1* | 4/2015 | Lemke | ............... | B62D 33/0621 296/190.08 |

FOREIGN PATENT DOCUMENTS

| | | | |
|---|---|---|---|
| JP | | 5183822 B1 | 4/2012 |
| JP | | 5297755 B2 | 9/2013 |

* cited by examiner

WORK VEHICLE AND CAB FOR WORK VEHICLE

TECHNICAL FIELD

The present invention relates to a work vehicle and a cab for work vehicle. The present invention particularly relates to a work vehicle which has a cab, and a cab for work vehicle.

BACKGROUND ART

A cab (an operator's compartment) of some crawler dozers has a portion projecting sideward from a body in a plan view.

Such a construction is disclosed, for example, in Japanese Patent No. 5183822. in some crawler dozers, a fuse box is arranged outside the cab, on a side of the cab or below the cab.

CITATION LIST

Patent Document

PTD 1: Japanese Patent No. 5183822

SUMMARY OF INVENTION

Technical Problem

When electric components such as a fuse box have been arranged outside the cab, dust easily enters the inside of the electric component. For this reason, it is considered to arrange an electric component in a cab. When the electric component has been arranged in the cab, however, an operator may be prevented from moving in the cab by the electric component.

The present invention was made in view of the problem described above. The object of the present invention is to provide a work vehicle and a cab for work vehicle in which entry of dust into an electric component can be suppressed and an operator is not prevented from moving in the cab by the electric component.

Solution to Problem

A work vehicle according to the present invention has a cab. The cab includes a front portion, a rear portion, a wall portion, and an electric component. The front portion has a doorway. The rear portion is arranged in the rear of the front portion. The rear portion has a front end smaller in width than a rear end of the front portion in a plan view. The wall portion is arranged between the front portion and the rear portion. The wall portion includes a front wall and a rear wall opposed to each other in a fore/aft direction with a gap lying therebetween in a plan view. The wall portion extends from the rear portion outward in a direction of width in a plan view. The electric component is arranged in the gap. The electric component projects into an indoor space in the cab from the gap through a first hole formed in the front wall. A foremost portion of the electric component is located in the rear of a foremost normal located foremost among normals to a line connecting a front end and a rear end of the doorway, which intersect with the front wall in a plan view.

According to the work vehicle in the present invention, the electric component is arranged in the gap between the two walls and in the indoor space in the cab. Therefore, as compared with a case that the electric component is arranged outside the cab, entry of dust into the electric component is suppressed.

In addition, the electric component is arranged in the gap between the two walls. Therefore, the gap between the two walls is made use of as a region where an electric component is arranged. Thus, a portion of the electric component which projects from between the two walls into the indoor space in the cab is reduced in size. Therefore, the foremost portion of the electric component can be arranged in the rear of the foremost normal. Thus, an operator is not prevented from moving in the cab by the electric component.

In the work vehicle above, the cab further includes a cover. The cover is attached to the front wall. The cover covers the electric component projecting into the indoor space in the cab through the first hole. The cover has a beveled portion at a corner portion on an inner side in the direction of width and is located in the rear of the foremost normal in a plan view.

Thus, an operator is not prevented from moving in the cab by the cover.

In the work vehicle above, the cab further includes a reinforcement plate. The reinforcement plate is attached to the front wall. The reinforcement plate surrounds the first hole.

This reinforcement plate suppresses lowering in strength of the cab due to provision of the first hole in the front wall. Therefore, distortion of the cab at the time of overturn of the work vehicle is suppressed.

In the work vehicle above, the rear wall has a projecting portion projecting rearward. The gap has a region expanding rearward owing to the projecting portion. At least a part of the electric component is arranged in the region expanding rearward owing to the projecting portion.

The projecting portion partially expands the gap rearward. Thus, the electric component can be arranged in a portion of the gap expanding rearward. Therefore, the electric component projecting into the indoor space can further be reduced in size.

In the work vehicle above, the rear wall includes a main wall and a sub wall. The main wall has a second hole. The sub wall is attached to the main wall and covers the second hole. The sub wall has a member containing a resin in a portion in contact with the main wall.

Thus, the sub wall is in contact with the main wall with the member containing a resin being interposed. Therefore, a gap is less likely to be formed between the main wall and the sub wall. Thus, soundproof performance and heat insulation performance of the indoor space in the cab are improved.

A cab for a work vehicle according to the present invention includes a front portion, a rear portion, a wall portion, and an electric component. The front portion has a doorway. The rear portion is arranged in the rear of the front portion. The rear portion has a front end smaller in width than a rear end of the front portion in a plan view. The wall portion is arranged between the front portion and the rear portion. The wall portion includes a front wall and a rear wall opposed to each other in a fore/aft direction with a gap lying therebetween in a plan view. The wall portion extends from the rear portion outward in a direction of width in a plan view. The electric component is arranged in the gap. The electric component projects into an indoor space in the cab from the gap through a first hole formed in the front wall. A foremost portion of the electric component is located in the rear of a foremost normal located foremost among normals to a line connecting a front end and a rear end of the doorway, which intersect with the front wall in a plan view.

According to the cab for the work vehicle in the present invention, the electric component is arranged in the gap between the two walls and in the indoor space in the cab.

Therefore, as compared with a case that the electric component is arranged outside the cab, entry of dust into the electric component is suppressed.

In addition, the electric component is arranged in the gap between the two walls. Therefore, the gap between the two walls is made use of as a region where an electric component is arranged. Thus, a portion of the electric component which projects from between the two walls into the indoor space in the cab is reduced in size. Therefore, the foremost portion of the electric component can be arranged in the rear of the foremost normal. Thus, an operator is not prevented from moving in the cab by the electric component.

Advantageous Effects of Invention

As described above, according to the present invention, a work vehicle and a cab in which entry of dust into an electric component can be suppressed and an operator is not prevented from moving in the cab by the electric component can be realized.

DESCRIPTION OF EMBODIMENTS

An embodiment of the present invention will be described hereinafter with reference to the drawings.

Firstly, a construction of a work vehicle according to one embodiment of the present invention will be described. In the following, a crawler dozer as one example of a work vehicle to which the idea of the present invention is applicable will be described with reference to FIGS. 1 and 2. It should be noted that the present invention is applicable to a crawler dozer and also to work vehicles having a cab such as a hydraulic excavator, a wheel loader, and the like.

In the present example, positional relation among portions will be described with an operator seated at an operator's seat in the cab being defined as the reference. A fore/aft direction refers to a fore/aft direction of the operator who sits at the operator's seat. A lateral direction (a width direction) refers to a lateral direction of the operator who sits at the operator's seat. An upward/downward direction refers to an upward/downward direction of the operator who sits at the driver's seat.

A direction in which the operator sitting at the operator's seat faces is defined as a fore direction and a direction opposed to the fore direction is defined as an aft direction. A right side and a left side at the time when the operator sitting at the operator's seat faces front are defined as a right direction and a left direction, respectively. The foot side of the operator who sits at the operator's seat is defined as the downward direction, and the head side of the operator is defined as the upward direction.

Figure 1:
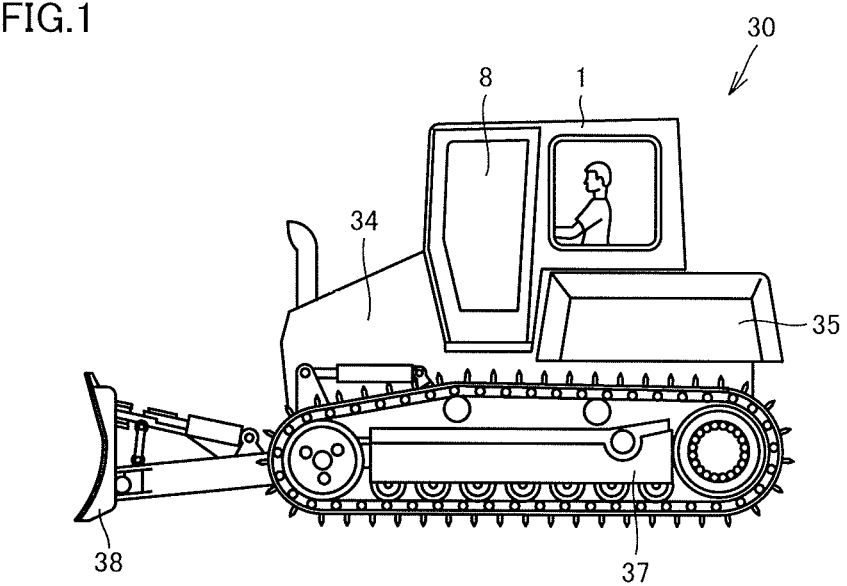
FIG. 1 is a side view schematically showing a construction of a work vehicle in one embodiment of the present invention.
Figure 2:
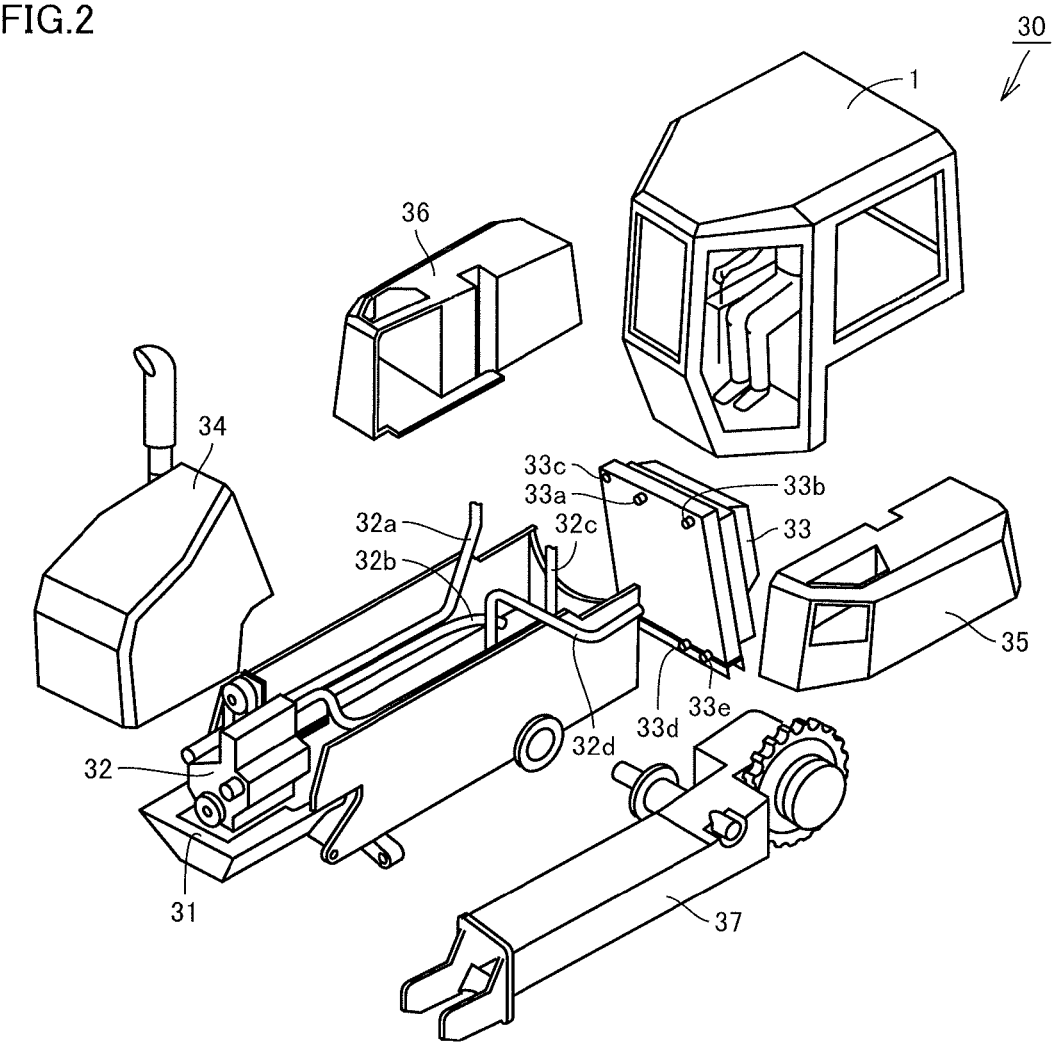
FIG. 2 is an exploded perspective view schematically showing the construction of the work vehicle in one embodiment of the present invention.

FIGS. 1 and 2 are a side view and an exploded perspective view schematically showing a construction of a work vehicle in one embodiment of the present invention, respectively.

As shown in FIGS. 1 and 2, a crawler dozer 30 in the present embodiment mainly has a cab (operator's compartment) 1, a vehicle frame 31, an engine 32, an engine cooling module 33, a nose portion module 34, a hydraulic oil tank module 35, a fuel tank module 36, a pair of track frame modules 37, and a dozing blade 38. Cab 1 has an operator's seat in the inside of cab 1.

Vehicle frame 31 has a front end and a rear end. Cab 1 is mounted on vehicle frame 31, between the front end and the rear end of vehicle frame 31. An operator's seat, an instrument panel, a steering mechanism, and the like are attached to this cab 1. Engine 32 is attached to vehicle frame 31 on a front end side of vehicle frame 31 relative to cab 1.

Nose portion module 34 covers engine 32 and an engine compartment. Cab 1 is arranged in the rear of engine 32 and the engine compartment which are covered with nose portion module 34.

Hydraulic oil tank module 35 serves to store a hydraulic oil. Hydraulic oil tank module 35 is arranged on one side (for example, on the left side) of cab 1. Hydraulic oil serves to actuate a work implement such as dozing blade 38 of crawler dozer 30. Fuel tank module 36 serves to store fuel to be supplied to engine 32. Fuel tank module 36 is arranged on the other side (for example, on the right side) of cab 1.

Cooling module 33 serves to cool engine 32 and the like. Cooling module 33 is attached to vehicle frame 31 at the rear end of vehicle frame 31. Cooling module 33 can include a radiator body portion. The radiator body portion includes a charge air cooling (CAC) apparatus, a hydraulic oil cooling apparatus, an engine cooling water cooling apparatus, and a cooling fan.

In a general crawler dozer, a cooling module is arranged on a front side of cab 1. On the other hand, cooling module 33 is arranged at the rear end of vehicle frame 31 as described above, in crawler dozer 30 shown in FIG. 1. Therefore, a length in a fore-/aft direction of nose portion module 34 in crawler dozer 30 shown in FIG. 1 can be shorter than a length in a fore/aft direction of nose portion module 34 in the general crawler dozer. Furthermore, a height at a front end of nose portion module 34 in crawler dozer 30 shown in FIG. 1 can be smaller than a height at a front end of nose portion module 34 in the general crawler dozer. Accordingly, crawler dozer shown in FIG. 1 can have better front viewability than the general crawler dozer.

The cooling fan in cooling module 33 can be driven independently of engine 32 by an electric motor, a hydraulic motor, or the like. Preferably, a fan speed is variable by means of hydraulic drive.

Cooling fluid conduits 32c, 32d are connected to an inlet port 33b and an outlet port 33e of cooling module 33. Thus, air taken into the engine is cooled. Similarly, conduits 32a, 32b are connected to an inlet port 33c and an outlet port (not shown) of cooling module 33. Thus, engine cooling water is cooled. An additional conduit (not shown) is connected to an inlet port 33a and an outlet port 33d of cooling module 33.

Thus, cooled hydraulic oil is supplied to a hydraulic circuit of a vehicle.

Cooling module 33 is arranged in the rear of cab 1, between a rear end portion of hydraulic oil tank module 35 and a rear end portion of fuel tank module 36. In this construction, an operator can visually recognize a rear area. The rear area is an area above cooling module 33, between hydraulic oil tank module 35 and fuel tank module 36. Thus, this crawler dozer 30 provides excellent rear visibility.

The pair of track frame modules 37 is arranged on left and right sides of vehicle frame 31, respectively. Dozing blade 38 is arranged in the front relative to the front end of vehicle frame 31.

Next, the construction of the cab frame used for the cab of the present embodiment will be described with reference to FIGS. 3 to 5.

Figure 3:
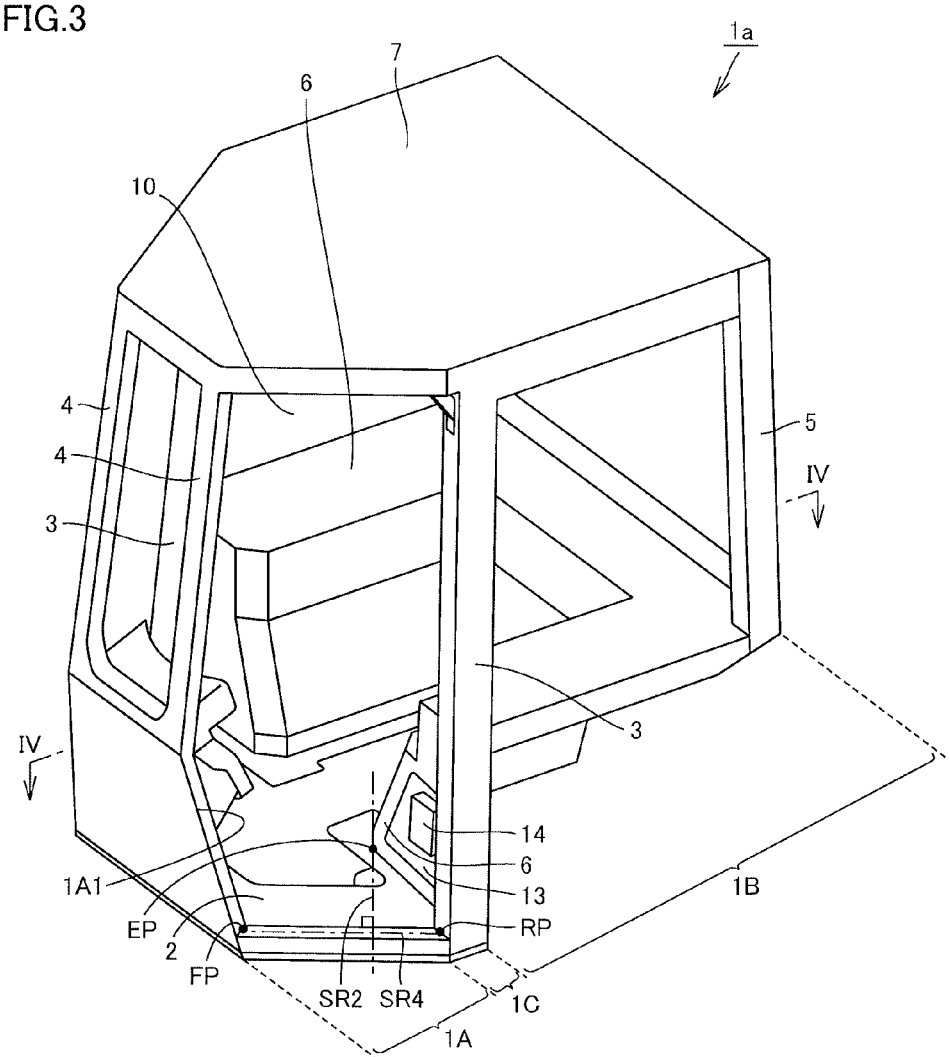
FIG. 3 is a perspective view schematically showing a cab frame of a cab for work vehicle in one embodiment of the present invention.

FIG. 3 is a perspective view schematically showing from above a cab frame of a cab for work vehicle in one embodiment of the present invention. FIG. 4 is a schematic cross sectional view along the line IV-IV in FIG. 3. FIG. 5 is a schematic cross sectional view showing region R in FIG. 4 as being enlarged.

As shown in FIG. 3, cab frame 1a in the present embodiment mainly has a floor frame 2, a plurality of pillars 3, 4, 5, a stand portion 6, and a roof portion 7. Cab frame 1a has a construction in which floor frame 2, the plurality of pillars 3, 4, 5, stand portion 6, and roof portion 7 are integrally assembled by welding.

Floor frame 2 is arranged on a bottom portion of cab 1. Stand portion 6 is connected to an upper surface of floor frame 2 by welding. Stand portion 6 extends upward from floor frame 2.

The plurality of pillars 3, 4, 5 are arranged in a side portion of cab 1. Each of the plurality of pillar 3, 4, 5 extends in the upward/downward direction. The plurality of pillars 3, 4, 5 include a pair of center pillars 3 on the left and right, a pair of front pillars 4 on the left and right, and a pair of rear pillars 5 on the left and right.

The pair of center pillars 3 on the left and right is connected to floor frame 2 by welding. The pair of rear pillars 5 on the left and right is connected to stand portion 6 by welding. Front pillar 4, center pillar 3, and rear pillar 5 are arranged sequentially in this order from the front to the rear of cab 1.

Roof portion 7 is arranged in an upper portion of cab 1. Roof portion 7 is supported against floor frame 2 and stand portion 6 by the plurality of pillars 3, 4, 5. Roof portion 7 is connected to the plurality of pillars 3, 4, 5 by welding. A space surrounded by floor frame 2, the plurality of pillars 3, 4, 5, stand portion 6, and roof portion 7 is defined as an indoor space 10 in cab 1.

Figure 4:
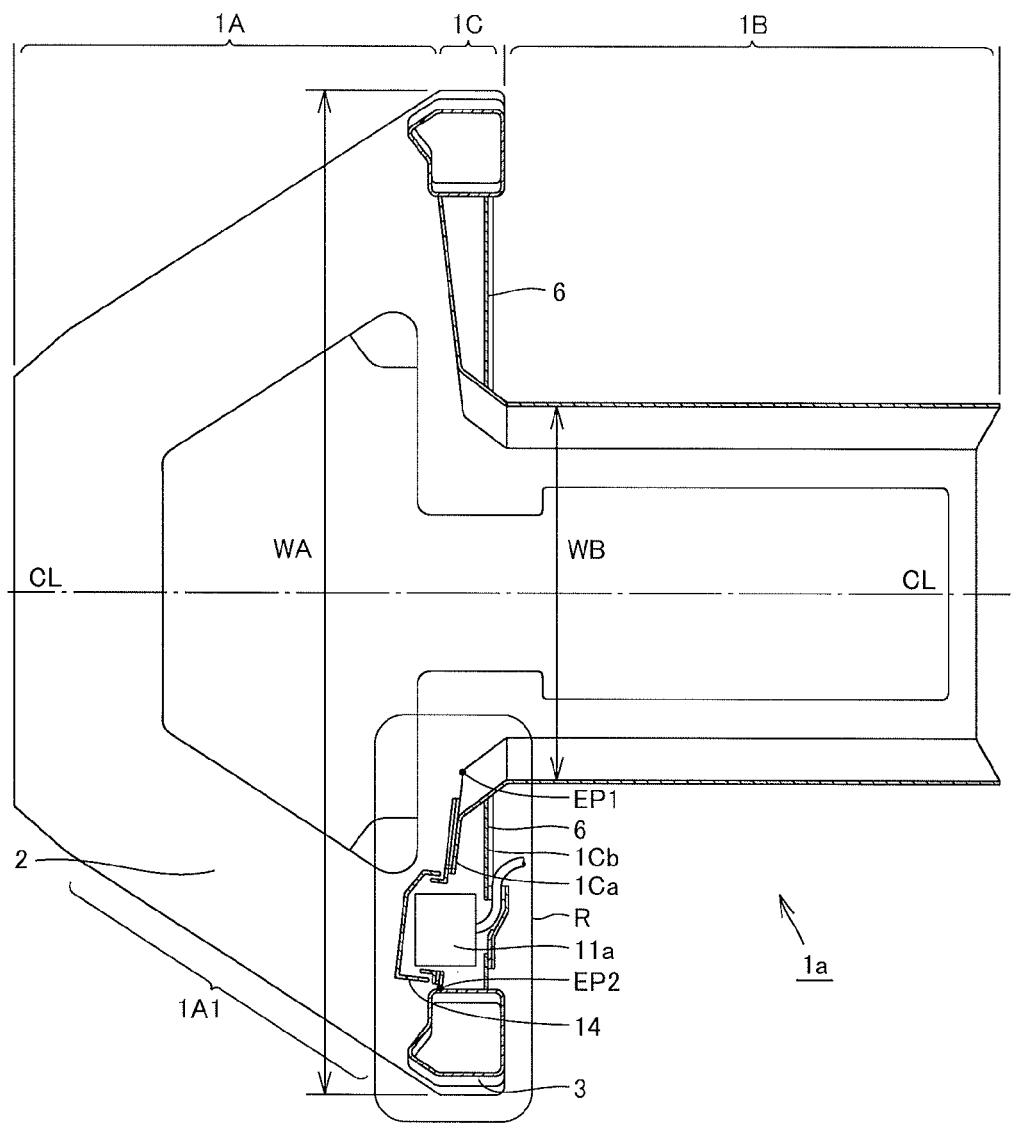
FIG. 4 is a schematic cross sectional view along the line IV-IV in FIG. 3, and is a view showing a front portion, a rear portion, and a wall portion of the cab in a plan view.

As shown in FIG. 4, cab 1 (or cab frame 1a) has a front portion 1A, a rear portion 1B, and a wall portion 1C. Front portion 1A is a portion from the front end of floor frame 2 to the froth end of center pillar 3. Rear portion 1B is a portion arranged in the rear of the rear end of center pillar 3. Wall portion 1C is arranged between front portion 1A and rear portion 1B.

As shown in FIGS. 3 and 4, front portion 1A has an opening 1A1. Opening 1A1 is a doorway 1A1 of the above-mentioned indoor space 10. Opening 1A1 is formed in a side surface of front portion 1A. Doorway (opening) 1A1 is surrounded by floor frame 2, front pillar 4, center pillar 3, and roof portion 7. A door 8 may be attached to doorway 1A1 as shown in FIG. 1.

As shown in FIG. 4, front portion 1A has a tapered shape in the lower portion of cab frame 1a in a plan view. A width WA of front portion 1A becomes smaller from the rear to the front in a plan view. A plan view means viewing floor frame 2 from above and downward as shown in FIG. 4.

Rear portion 1B is arranged in the rear of front portion 1A. Rear portion 1B has a front end having a width WB smaller than width WA of the rear end of front portion 1A in the lower portion of cab frame 1a, in a plan view.

Figure 5:
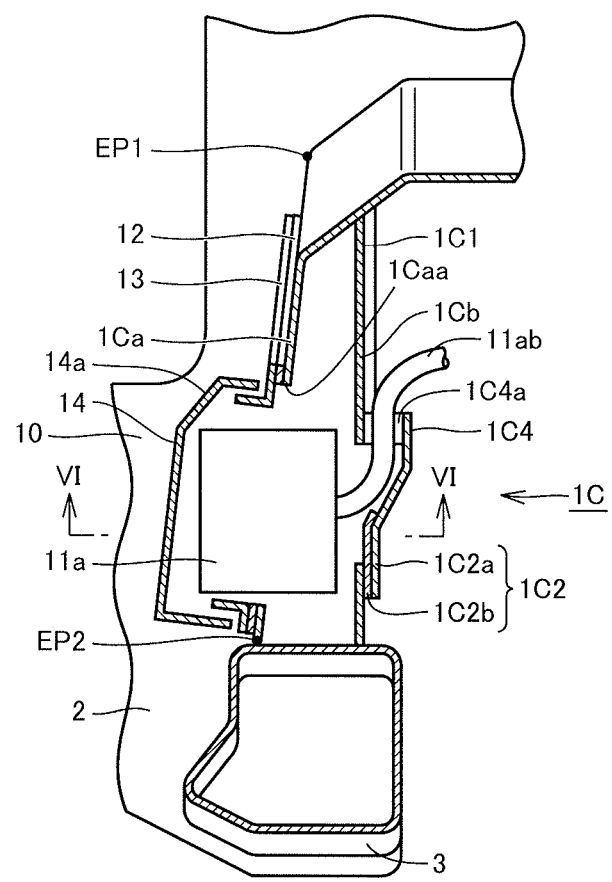
FIG. 5 is a schematic cross sectional view showing a region R in FIG. 4 as being enlarged.

As shown in FIGS. 4 and 5, wall portion 1C has a front wall 1Ca and a rear wall 1Cb. Each of front wall 1Ca and rear wall 1Cb extends outward from the front end of rear portion 1B in the width direction in a plan view. Wall portion 1C is a projecting portion projecting sideward from the front end of rear portion 1B. Outward in the width direction means outward of cab 1 from a centerline CL in the width direction of cab 1 with centerline CL (FIG. 4) extending to the fore/aft direction through the center of the width direction of cab 1 being defined as the reference.

Front wall 1Ca and rear wall 1Cb are opposite to each other in the fore/aft direction in a plan view. There is a gap between front wall 1Ca and rear wall 1Cb. Front wall 1Ca has a first end portion EP1 and a second end portion EP2 in a plan view. First end portion EP1 is located on the inner side in the width direction of front wall 1Ca. Second end portion EP2 is located on the outer side in the width direction of front wall 1Ca. The inner side in the width direction means a side toward centerline CL in the width direction of cab 1 with centerline CL (FIG. 4) extending in the fore/aft direction through the center of the width direction of cab 1 being defined as the reference.

Each of front wall 1Ca and rear wall 1Cb is connected to each of floor frame 2 and center pillar 3 by welding. A through hole (first hole) 1Caa is formed in front wall 1Ca. The gap between two walls 1Ca and 1Cb and indoor space 10 of cab 1 are connected to each other by through hole 1Caa.

Next, arrangement of electric components, such as a fuse box, a relay, and the like in the above-mentioned cab frame 1a will be described with reference to FIGS. 5 to 7.

Figure 6:
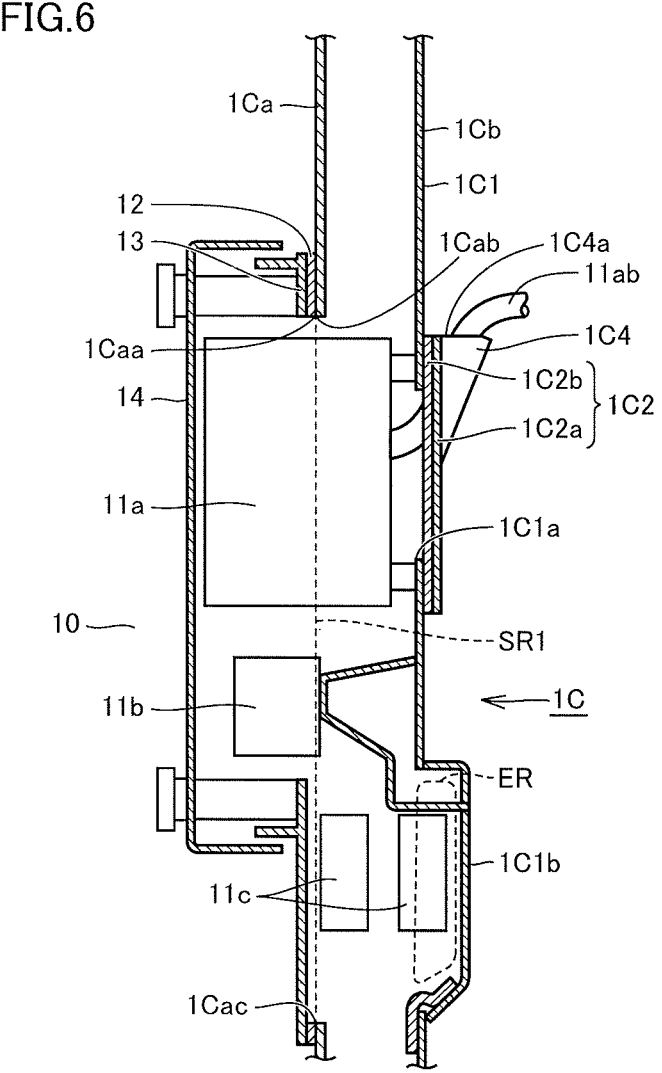
FIG. 6 is a schematic cross sectional view along the line VI-VI in FIG. 5.

FIG. 6 is a schematic cross sectional view along the line VI-VI in FIG. 5. FIG. 7 is a schematic perspective view showing the construction of a sub wall. FIG. 8 is a view for explaining an arrangement position of a fuse cover with respect to a doorway of the cab in the work vehicle shown in FIG. 1.

As shown in FIG. 6, electric components 11a, 11b, and 11c are arranged in the gap between two walls 1Ca and 1Cb. Each of electric component 11a and electric component 11b is a fuse box, for example. Electric component 11c is a relay, for example.

The plurality of fuses (not shown) are arranged in the fuse box. Electric component 11a accommodates more fuses than electric component 11b. This electric component 11a is arranged above electric component 11b.

Electric component 11c which is implemented by a relay is arranged under electric component (fuse box) 11b. The plurality of electric components (relays) 11c may be arranged in the gap between two walls 1Ca and 1Cb.

Electric components 11a and 11b project into indoor space 10 in cab 1 from the gap between two walls 1Ca and 1Cb by way of through hole 1Caa of front wall 1Ca. Each of electric components 11a and 11b has a portion arranged in front of a virtual straight line (broken line SR1) which connects an upper end 1Cab and a lower end 1Cac of through hole 1Caa to each other.

Electric component 11c does not project into indoor space 10 of cab 1 by way of through hole 1Caa, however, electric component 11c may project into indoor space 10 of cab 1 from the gap between two walls 1Ca and 1Cb by way of through hole 1Caa.

Rear wall 1Cb has a main wall 1C1 and a sub wall 1C2. Main wall 1C1 is connected to each of floor frame 2 and center pillar 3 by welding. A through hole (second hole) 1C1a is formed in main wall 1C1.

Sub wall 1C2 is attached to main wall 1C1 with a bolt or the like. Sub wall 1C2 covers through hole 1C1a of main wall 1C1.

Figure 7:
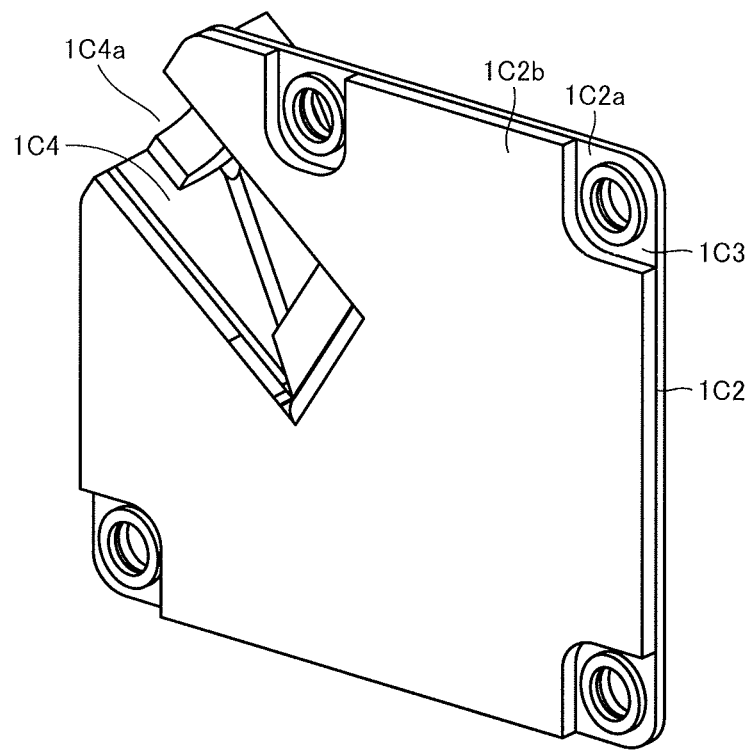
FIG. 7 is a schematic perspective view showing the construction of a sub wall.
Figure 8:
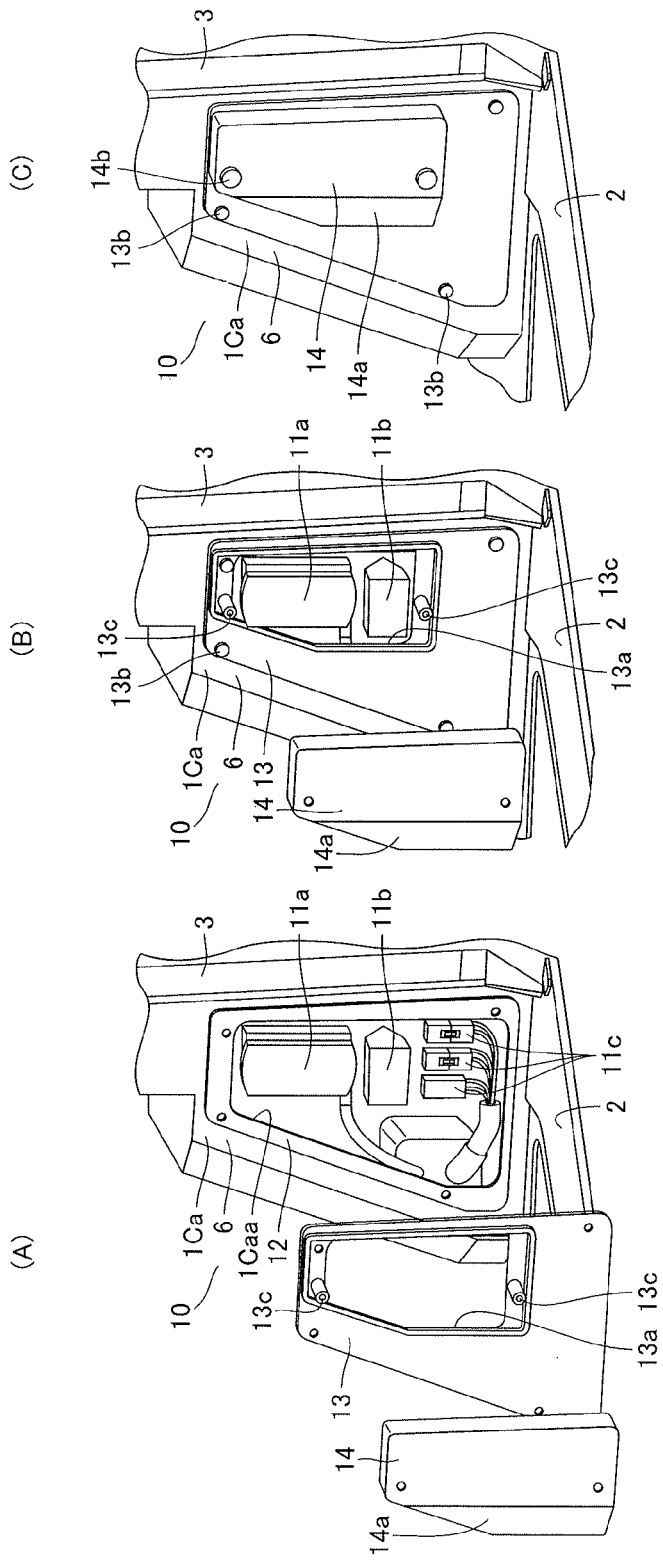
FIG. 8 is a perspective view schematically showing the construction around an electric component.

As shown in FIG. 7, sub wall 1C2 has a metal plate 1C2a and a resin member 1C2b. Metal plate 1C2a is composed of a metal, such as steel, for example. Metal plate 1C2a has a flat plate 1C3 and a cable pull-out portion 1C4.

Cable pull-out portion 1C4 projects rearward from flat plate 1C3. Cable pull-out portion 1C4 has an opening 1C4a in a rear side portion. Opening 1C4a is provided in order to pull out a cable from the gap between two walls 1Ca and 1Cb to the outside of cab 1.

Resin member 1C2b is composed of a material containing resin. Resin member 1C2b is composed, for example, of urethane, rubber, or the like.

As shown in FIGS. 5 and 6, in a state where sub wall 1C2 is attached to main wall 1C1, resin member 1C2b is in contact with main wall 1C1. In this state, a cable 11ab of electric component 11a is pulled out of the gap between two walls 1Ca and 1Cb to the outside of cab 1 through opening 1C4a of sub wall 1C2.

Rear wall 1Cb may have a projecting portion 1C1b projecting rearward partially. The gap between two walls 1Ca and 1Cb has a region ER expanded rearward owing to projecting portion 1C1b. At least a part of electric component 11c is arranged in this expanded region ER. The whole electric component 11c may be arranged in expanded region ER.

Next, the construction around electric components 11a to 11c is will be described with reference FIGS. 8 (A) to 8 (C).

FIGS. 8(A) to 8(C) are perspective views schematically showing the construction around an electric component.

As shown in FIG. 8 (A), reinforcement plate 12, first cover 13, and second cover 14 are attached to front wall 1Ca on the side of indoor space 10. Reinforcement plate 12 surrounds through hole 1Caa of front wall 1Ca.

In a state where reinforcement plate 12 is attached to front wall 1Ca, all electric components 11a to 11c are exposed on the side of indoor space 10 by way of through hole 1Caa. In particular, electric components 11a and 11b project from the gap between two walls 1Ca and 1Cb into indoor space 10 by way of through hole 1Caa.

As shown in FIG. 8 (B), first cover 13 is attached to front wall 1Ca with reinforcement plate 1.2 being interposed. First cover 13 is attached to front wall 1Ca with a bolt 13b, for example. First cover 13 has a through hole 13a.

In a state where first cover 13 is attached to front wall 1Ca, electric components 11a and 11b are exposed on the side of indoor space 10 by way of through hole 1Caa. Electric component 11c is covered with first cover 13.

As shown in FIG. 8 (C), second cover 14 is attached to front wall 1Ca with reinforcement plate 12 and first cover 13 being interposed. Second cover 14 is attached to front wall 1Ca by screwing a bolt 14b into a female screw portion 13c of first cover 13, for example.

Second cover 14 has a shape projecting into indoor space 10. A portion of second cover 14 projecting into indoor space 10 covers electric components 11a and 11b.

Next, positions of electric components 11a to 11c and second cover 14 with respect to the position of doorway (opening) 1A1 of cab 1 will be described with reference to FIG. 9.

Figure 9:
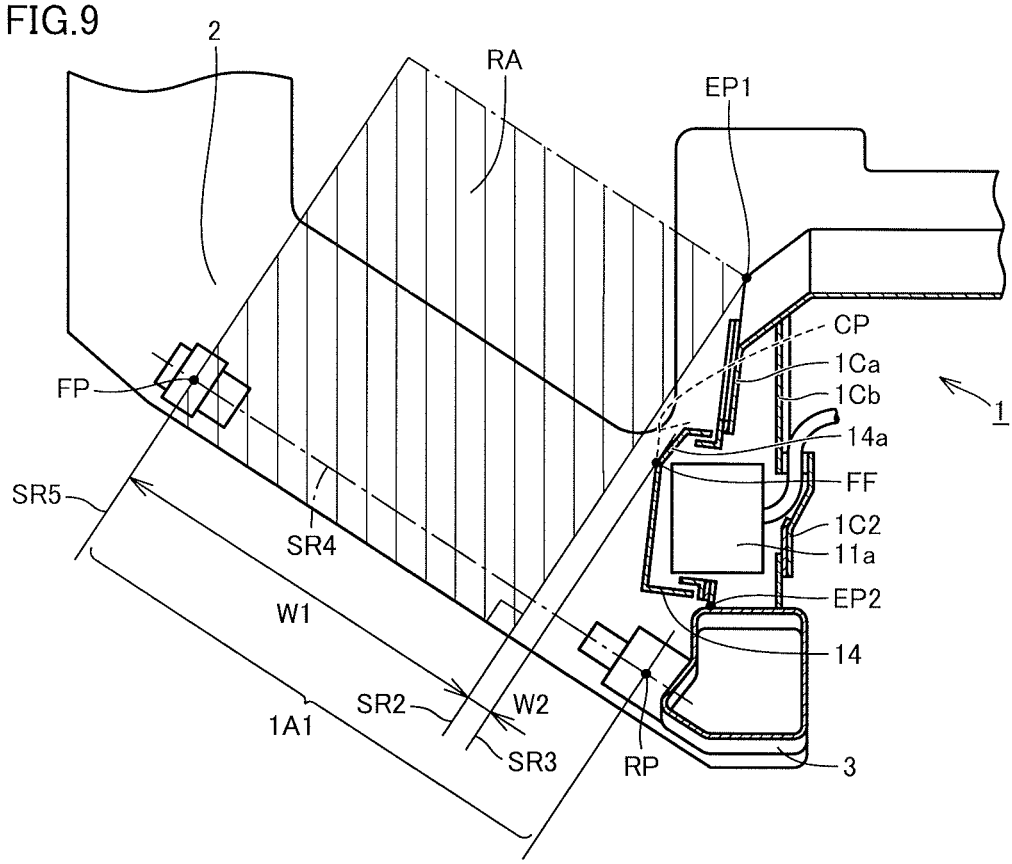
FIG. 9 is a schematic cross sectional view for explaining an arrangement position of a fuse cover with respect to a doorway of a cab in the work vehicle shown in FIG. 1.

As shown in FIG. 9, a virtual straight line SR4 connecting front end FP and rear end RP of doorway (opening) 1A1 to each other is set in a plan view. Front end FP and rear end RP represent the front end and the rear end in a portion having a minimum opening width W1 of doorway (opening) 1A1 within a range of the height from the upper surface of floor frame 2 to the upper end of second cover 14.

In the present embodiment, the portion having minimum opening width W1 is located, for example, at a lowermost end portion of doorway 1A1 as shown in FIG. 3. Therefore, front end FP and rear end RP are located at the lowermost end portion of doorway 1A1.

The upper end of second cover 14 is located within a height range, for example, up to 460 mm from the floor.

Next, in a plan view, a virtual normal SR2 to straight line SR4 is set. Normal SR2 is the foremost normal SR2 located foremost among the normals intersecting with front wall 1Ca. Foremost normal SR2 is a straight line which passes through first end portion EP1 of front wall 1Ca, for example.

In the present embodiment, first end portion EP1 is located, for example, in the lowermost end portion of stand portion 6, as shown in FIG. 3. Each foremost portion of electric components 11a to 11c is located in the rear of foremost normal SR2.

Earth-moving machinery with the access system for operators and maintenance personnel is defined in JIS A8302 of Japanese Industrial Standards and ISO 2867 of the international standard of International Standardization Organization. This standard deals with slip, trip, and the like of persons.

This standard specifies "the vertical distance from the floor of the lower (narrower) area of the minimum opening can be increased from 460 mm to 770 mm maximum, in conjunction with an increase in the minimum width from 250 mm to 300 mm."

Therefore, at a height of 460 mm or less from the floor, minimum opening width W1 of doorway (opening) 1A1 is 250 mm or more. Minimum opening width W1 of doorway (opening) 1A1 is 300 mm or more within the height range from 460 mm to 700 mm from the floor.

In a plan view, a virtual straight line SR5 being parallel to foremost normal SR2 and passing through front end FP of doorway (opening) 1A1 is set. As described previously, each foremost portion of electric components 11a to 11c is located in the rear of foremost normal SR2. Therefore, obstacles (electric components 11a to 11c, second cover 14, and the like) are not arranged in a region RA (a hatched region in FIG. 9) extending from doorway (opening) 1A1 to first end portion EP1, between straight line SR5 and foremost normal SR2, at all height positions of doorway 1A1.

Second cover 14 has a beveled portion 14a in a plan view. Beveled portion 14a is formed at a corner portion CP on an inner side in the width direction of second cover 14, in a plan view. In a plan view, a surface of beveled portion 14a is substantially parallel to foremost normal SR2, for example.

Second cover 14 is located in the rear of foremost normal SR2. In a plan view, a virtual straight line SR3 extending parallel to foremost normal SR2 is set. This straight line SR3 passes through a foremost portion FF of second cover 14. Straight line SR3 is located in the rear of foremost normal SR2. There is a gap having a width W2 between straight line SR3 and foremost normal SR2.

Figure 10:
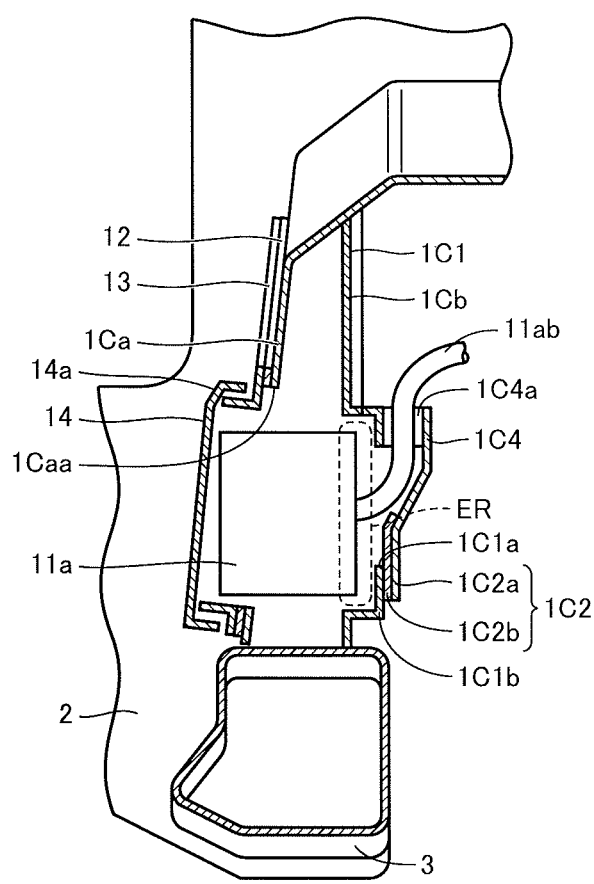
FIG. 10 is a schematic cross sectional view showing the construction in which a gap between two walls is expanded rearward partially and the electric component (fuse box) is arranged in an expanded region of the gap.

Projecting portion 1C1b may be formed in the rear of at least one of electric component 11a and electric component 11b, as shown in FIG. 10. The gap between two walls 1Ca and 1Cb has region ER expanding rearward owing to projecting portion 1C1b. At least a part of electric components 11a and 11b is arranged in this expanded region ER. The whole electric components 11a and 11b may be arranged in expanded region ER.

In this construction, sub wall 1C2 may be attached behind projecting portion 1C1b. In this case, resin member 1C2b of sub wall 1C2 is in contact with the rear surface of projecting portion 1C1b.

Next, functions and effects of the present embodiment will be described.

According to the present embodiment, electric components 11a to 11c are arranged in the gap between two walls 1Ca and 1Cb and in indoor space 10 in cab 1. Therefore, as compared with a case that electric components 11a to 11c are arranged outside cab 1, entry of dust into electric components 11a to 11c is suppressed.

In addition, electric components 11a to 11c are arranged in the gap between two walls 1Ca and 1Cb. Therefore, the gap between two walls 1Ca and 1Cb is made effective use of as a region where electric components 11a to 11c are arranged. Thus, a portion of electric components 11a and 11b which projects from wall 1Ca into indoor space 10 in cab 1 is reduced in size. Therefore, the foremost portions of electric components 11a and 11b can be arranged in the rear of foremost normal SR2, as shown in FIG. 9. Thus, obstacles are not arranged in region RA which is defined by extending minimum opening width WI of doorway 1 Al defined under Japanese Industrial Standards and the international standard from doorway 1A1 to first end portion EP1, as shown in FIG. 9 Accordingly, an operator is not prevented from moving in cab 1 by electric components 11a and 11b.

Furthermore, wall portion 1C which connects the rear end of front portion 1A and the front end of rear portion 1B has two walls 1Ca and 1Cb. Therefore, the strength, soundproof performance, and heat insulation performance of cab 1 are improved. Particularly, two walls 1Ca and 1Cb are extended in the width direction. Therefore, even if external force is applied to cab 1 in the width direction at the time of overturn of work vehicle 30, distortion of cab 1 is suppressed.

Second cover 14 is located in the rear of foremost normal SR2 as shown in FIG. 9. Thus, the operator is not prevented from moving in cab 1 by second cover 14.

Moreover, second cover 14 has beveled portion 14a at corner portion CP on an inner side in the width direction in a plan view. Therefore, second cover 14 can be located in the further rear of foremost normal SR2. Specifically, width W2 between foremost normal SR and straight line SR3 is increased, as shown in FIG. 9.

Reinforcement plate 12 is attached to front wall 1Ca and surrounds through hole 1Caa, as shown in FIG. 8 (A). Thus, reinforcement plate 12 suppresses lowering in strength of cab 1 due to provision of through hole 1Caa in front wall 1Ca. Accordingly, distortion of cab 1 at the time of overturn of work vehicle 30 is suppressed.

Rear wall 1Cb has projecting portion 1C1b projecting rearward, as shown in FIGS. 6 and 10. Thus, the gap between two walls 1Ca and 1Cb has region ER expanding rearward owing to projecting portion 1C1b. At least a part of electric components 11a to 11c is arranged in region ER expanded rearward. Thus, the projecting portion of electric components 11a to 11c projecting into indoor space 10 of cab 1 can further be reduced in size.

Sub wall 1C2 is attached to main wall 1C1 with resin member 1C2b being interposed, as shown in FIGS. 5 and 6. Thus, a gap is less likely to be formed between main wall 1C1 and sub wall 1C2. Thus, the soundproof performance and heat insulation performance of indoor space 10 of cab 1 are improved.

It should be understood that the embodiment disclosed herein is illustrative and non-restrictive in every respect. The scope of the present invention is defined by the terms of claims, rather than the description set forth above, and is intended to include any modifications within the scope and meaning equivalent to the terms of the claims.

REFERENCE SIGNS LIST 1 cab; 1A front portion; 1A1 doorway (opening); 1B rear portion; 1C wall portion; 1C1 main wall; 1C1a, 1Caa, 13a through hole; 1C1b projecting portion; 1C2 sub wall; 1C2a metal plate; 1C2b resin member; 1C3 flat plate; 1C4 cable pull-out portion; 1C4a opening; 1Ca, 1Cb wall; 1Cab upper end; 1Cac lower end; 1a cab frame; 2 floor frame; 3 center pillar; 4 front pillar; 5 rear pillar; 6 stand portion; 7 roof portion; 8 door; 10 indoor space; 11a, 11b, 11c electric component; 11ab cable; 12 reinforcement plate; 13 first cover; 13b, 14b bolt; 13c female screw portion; 14 second cover; 14a beveled portion; 30 crawler dozer; 31 vehicle frame; 32 engine; 32a conduit; 32c cooling fluid conduit; 33 cooling module; 33a, 33b, 33c inlet port; 33d, 33e outlet port; 34 nose portion module; 35 hydraulic oil tank module; 36 fuel tank module; 37 track frame module; 38 dozing blade; EP end portion; FF foremost portion; FP front end; RP rear end.

The invention claimed is:

1. A work vehicle, comprising a cab,
said cab including
a front portion having a doorway,
a rear portion arranged in rear of said front portion and having a front end smaller in width than a rear end of said front portion in a plan view,
a wall portion arranged between said front portion and said rear portion, including a front wall and a rear wall opposed to each other in a fore/aft direction with a gap lying therebetween in a plan view, and extending from said rear portion outward in a direction of width, and
an electric component arranged in said gap and projecting into an indoor space in said cab from said gap through a first hole formed in said front wall, a foremost portion of said electric component being located in rear of a foremost normal located foremost among normals to a line connecting a front end and a rear end of said doorway, which intersect with said front wall in a plan view.

2. The work vehicle according to claim 1, wherein
said cab further includes a cover attached to said front wall and covering said electric component projecting into said indoor space in said cab through said first hole, and
said cover has a beveled portion at a corner portion on an inner side in said direction of width and is located in the rear of said foremost normal in a plan view.

3. The work vehicle according to claim 1, wherein
said cab further includes a reinforcement plate attached to said front wall and surrounding said first hole.

4. The work vehicle according to claim 1, wherein
said rear wall has a projecting portion projecting rearward,
said gap has a region expanding rearward owing to said projecting portion, and
at least a part of said electric component is arranged in said region expanding rearward owing to said projecting portion.

5. The work vehicle according to claim 1, wherein
said rear wall includes a main wall having a second hole and a sub wall attached to said main wall and covering said second hole, and
said sub wall has a member containing a resin in a portion in contact with said main wall.

6. A cab for a work vehicle, comprising:
a front portion having a doorway;
a rear portion arranged in rear of said front portion and having a front end smaller in width than a rear end of said front portion in a plan view;
a wall portion arranged between said front portion and said rear portion, including a front wall and a rear wall opposed to each other in a fore/aft direction with a gap lying therebetween in a plan view, and extending from said rear portion outward in a direction of width; and an electric component arranged in said gap and projecting into an indoor space in said cab from said gap through a first hole formed in said front wall, a foremost portion of said electric component being located in rear of a foremost normal located foremost among normals to a line connecting a front end and a rear end of said doorway, which intersect with said front wall in a plan view.

* * * * *